US008432954B2

(12) United States Patent
Hudson et al.

(10) Patent No.: US 8,432,954 B2
(45) Date of Patent: Apr. 30, 2013

(54) VIDEO SERIALIZER/DESERIALIZER HAVING SELECTABLE MULTI-LANE SERIAL INTERFACE

(75) Inventors: John Hudson, Burlington (CA); Ryan Eckhardt, Kitchener (CA)

(73) Assignee: Semtech Canada Inc. (CA)

( * ) Notice: Subject to any disclaimer, the term of this patent is extended or adjusted under 35 U.S.C. 154(b) by 1560 days.

(21) Appl. No.: 11/842,257

(22) Filed: Aug. 21, 2007

(65) Prior Publication Data

US 2008/0056382 A1    Mar. 6, 2008

Related U.S. Application Data

(60) Provisional application No. 60/841,813, filed on Sep. 1, 2006.

(51) Int. Cl.
*H04B 1/38*          (2006.01)

(52) U.S. Cl.
USPC ............ 375/219; 348/512; 348/515; 370/470

(58) Field of Classification Search ........................ None
See application file for complete search history.

(56) References Cited

U.S. PATENT DOCUMENTS

| | | | | |
|---|---|---|---|---|
| 6,539,051 | B1* | 3/2003 | Grivna | 375/219 |
| 7,058,004 | B2* | 6/2006 | Jain et al. | 370/204 |
| 7,106,099 | B1* | 9/2006 | Nix | 326/40 |
| 7,376,767 | B1* | 5/2008 | Black et al. | 710/52 |
| 2001/0033188 | A1* | 10/2001 | Aung et al. | 327/141 |
| 2003/0142233 | A1* | 7/2003 | Eckhardt et al. | 348/512 |
| 2007/0050805 | A1* | 3/2007 | Rotenstein | 725/19 |
| 2007/0188189 | A1* | 8/2007 | Venkata et al. | 326/41 |

* cited by examiner

*Primary Examiner* — Edan Orgad
*Assistant Examiner* — Brian Olion
(74) *Attorney, Agent, or Firm* — Jones Day

(57) ABSTRACT

A video processing system may include a video deserializer, a video serializer and a programmable video processing device. The video deserializer may have an input for receiving a serial data stream containing video data and a serial to pseudo-parallel converter, coupled to the serial data stream, for generating a plurality of serial output lanes from the serial data stream. The video serializer may have a plurality of inputs for receiving serial data streams and a pseudo-parallel to serial converter, coupled to the plurality of input serial data streams, for generating a single serial data stream from the plurality of input serial data streams. The programmable video processing device may be coupled to the video deserializer and the video serializer, and may have a plurality of interface pins for receiving the plurality of serial output lanes from the deserializer and for transmitting the plurality of serial data streams to the serializer.

49 Claims, 5 Drawing Sheets

VIDEO SERIALIZER/DESERIALIZER HAVING SELECTABLE MULTI-LANE SERIAL INTERFACE

CROSS-REFERENCE TO ELATED APPLICATION

This application claims priority from United Stated Provisional Application No. 60/841,813, titled "Video Serializer/Deserializer Having Selectable Multi-Lane Serial Interface," filed on Sep. 1, 2006, the entirety of which is incorporated herein by reference.

TECHNICAL FIELD

This application describes a video serializer/deserializer having a selectable multi-lane serial interface.

BACKGROUND

Video serializers/deserializers are known in this field. An example of this type of device is set forth in U.S. Pat. No. 7,030,931, titled "Video Serializer/Deserializer with Embedded Audio Support," which is assigned to the assignee of this application, and is incorporated into this application in its entirety.

Presently, if circuit board designers want to transmit or receive serial video signals, such as HD-SDI signals, to or from an FPGA video processor, for example, there are two options: i) use a high-speed transceiver I/O on the FPGA, such as the Xilinx Rocket I/Os or the high-speed transceivers on Altera's Stratix GX devices; or ii) connect to an external serializer using a 10-bit parallel interface at 148.5 MHz or a 20-bit parallel interface at 74.25 MHz. Both options pose problems, however, for the designer.

The problems with option i) include: 1) jitter performance of high-speed transceivers; 2) high-cost of FPGA with these transceivers; and 3) limited number of high-speed transceivers (I/Os) on the FPGA. The problems with option ii) include: 1) it uses many I/Os on the FPGA in many cases the FPGA design can run out of I/Os before ruining out of logic; 2) because this "parallel interface" is single-ended it is not noise-immune and is not suitable for running across a large PCB; and 3) because this "parallel interface" has numerous traces it is not suitable for running across a backplane or to a daughter card.

SUMMARY

In accordance with the teaching described herein, a video processing system may include a video deserializer, a video serializer and a programmable video processing device. The video deserializer may have an input for receiving a serial data stream containing video data and a serial to pseudo-parallel converter, coupled to the serial data stream, for generating a plurality of serial output lanes from the serial data stream. The video serializer may have a plurality of inputs for receiving serial data streams and a pseudo-parallel to serial converter, coupled to the plurality of input serial data streams, for generating a single serial data stream from the plurality of input serial data streams. The programmable video processing device may be coupled to the video deserializer and the video serializer, and may have a plurality of interface pins for receiving the plurality of serial output lanes from the deserializer and for transmitting the plurality of serial data streams to the serializer.

DETAILED DESCRIPTION

The technology described herein includes a video serializer/deserializer having a selectable multi-lane serial interface. The selectable multi-lane serial interface is also referred to herein as a "pseudo-parallel" interface. In the example devices disclosed herein, the "parallel" side interface of the serializer/deserializer is not a true parallel interface in which, for example, an 8-bit serial data stream is converted into an 8-bit parallel interface, but instead comprises a "pseudo-parallel" interface in which a selectable number of Low Voltage Differential Signaling (LVDS) serial lanes are generated from the serial data stream.

The example devices described herein may provide the following advantages over known video serializer/deserializers: 1) reduced pin count for the serializer/deserializer chip and the corresponding FPGA to which it connects, which is important because FPGA designs are often pin-limited; 2) enables the serializer/deserializer and the FPGA to be physically displaced from one another—the traces between the two devices could extend along a PCB or over a backplane. These are just two of the many advantages that may be provided by the example devices now described in more detail.

Figure 1:
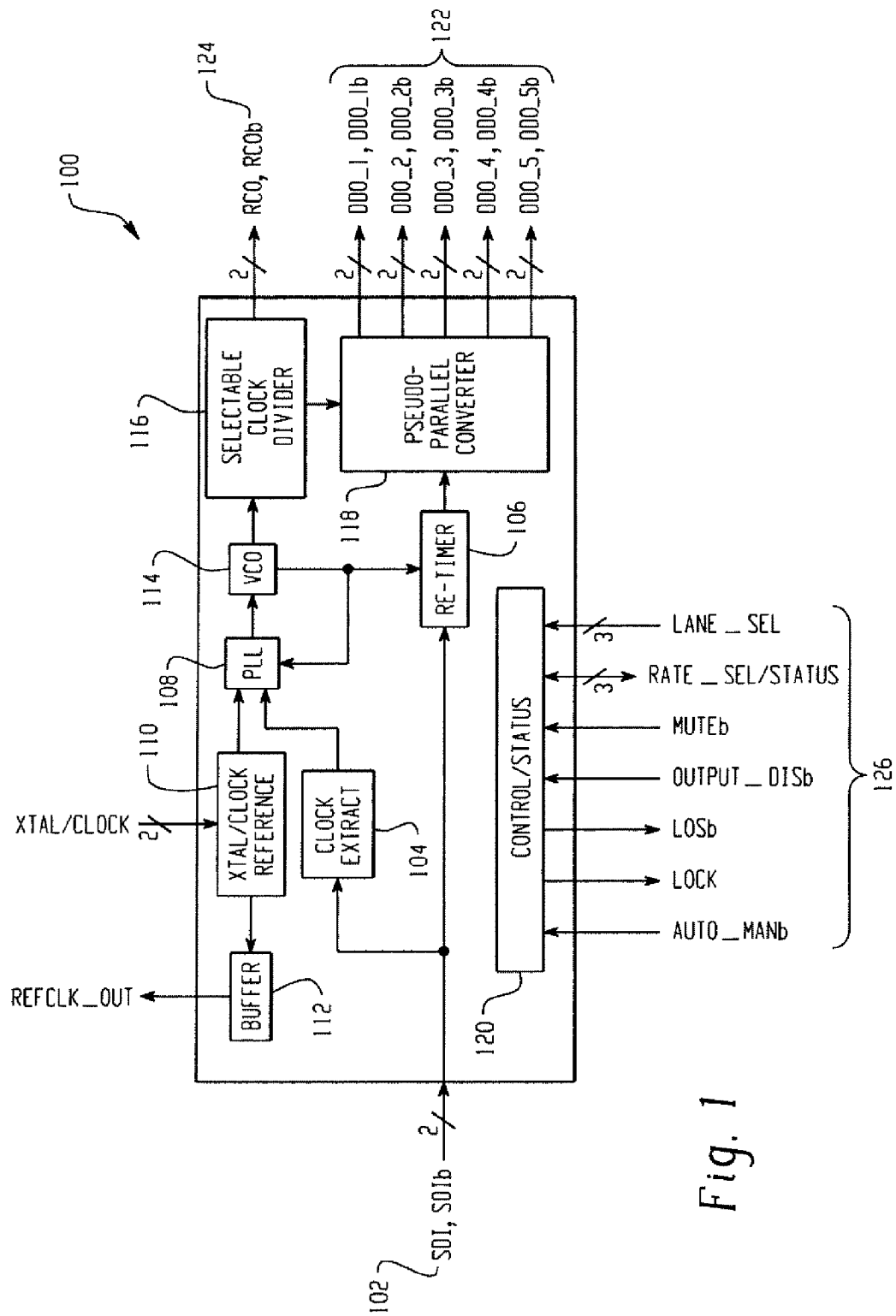
FIG. 1 is a block diagram of an example video deserializer having a selectable multi-lane serial interface.

FIG. 1 is a block diagram of an example video deserializer 100 having a selectable multi-lane serial interface 122. The exemplary deserializer 100 includes a clock extract block 104, a retimer 106, a phase locked loop 108, a voltage controlled oscillator 114, a crystal clock reference block 110, a buffer 112, a selectable clock divider 116, a selectable serial to pseudo-parallel converter 118 for generating the multi-lane serial interface 122, and a control/status block 120.

Differential serial data SDI, SDIb 102 is provided to the video deserializer 100 and is received by the re-timer block 106 and the clock extract block 104. The signal 102 is shown as differential because it is typically being provided through an equalizer block (not shown in FIG. 1), but could alternatively be a single-ended type signal. In addition, although not shown in FIG. 1, the equalizer could be implemented as part of the deserializer 100, in which case a single ended serial data signal 102 would be provided to the on-chip equalizer embedded in the deserializer 100.

Clocking information carried by the serial data stream 102 is extracted by block 104 and provided as one input to the phase locked loop circuit 108, which, along with circuits 114 and 110 comprise a clock and data recovery circuit (CDR). An external crystal clock reference is received by the clock reference block 110 and is provided to the other input of the phase locked loop 108, which compares this signal with the extracted clock signal from block 104 and a feedback signal from the voltage controlled oscillator 114, and generates an error signal that drives the voltage controlled oscillator 114. Although shown separate in this figure, the VCO may be part of the PLL block 108. The output of the VCO loops back as a feedback signal to the PLL 108 and is also provided to the re-timer block 106 and the selectable clock divider 116. The output of the re-timer block 106 is a re-timed version of the serial data stream 102 that is locked to the external clock reference 110. The re-timer block may be implemented as a Data Locked Loop (DLL) having a voltage controlled delay line. The DLL may remove signal skew in the serial data signal 102.

The re-timed serial data stream from the re-timer block 106 is provided to the selectable serial to pseudo-parallel converter 118 for generating the multi-lane serial interface 122. This converter 118 may also provide decoding/descrambling operations, as discussed in more detail below in reference to FIGS. 5 and 6. A three-bit control input, LANE_SEL, is provided to the control/status block 120 and is used to select the number of LVDS serial lanes 122 to be output by the serial to pseudo-parallel converter 118, and is also provided to the clock divider 116 to set the appropriate clocking frequency for the LVDS lanes 122. As shown in this example circuit, the serial to pseudo-parallel converter 118 is selectable for generating either 1, 2, 4 or 5 serial LVDS lanes from the single differential serial data stream 102. More or less lanes could also be provided in alternative designs.

Using this "pseudo-parallel" interface 122, for example, a SMPTE 292M 1.485 Gb/s interface can be realized using 4 LVDS serial lanes operating at 371 Mb/s. Similarly, a SMPTE 424M 2.970 Gb/s SDI interface can be realized using 5 LVDS serial lanes operating at 594 Mb/s. This interface 122 between the serializer/deserializer and the FPGA video processor provides many additional advantages, such as (1) transmitting the serial data as fast as possible for a given FPGA and with as few lanes as possible, thereby saving pins on the FPGA and the serializer/deserializer; (2) using noise-immune differential signaling (LVDS), which can run across large noisy circuit boards without losing signal integrity; (3) having fewer trace connections and noise-immune signaling allows the designer to run this interface across a backplane; and (4) the output jitter of the serializer is not dependant on the jitter of the clock coming from the FPGA, but on the an external clock 110, which can be lower in jitter.

In addition to the LANE_SEL input, several other control status pins are provided 126, including an AUTO_MANb input, a LOCK output, a LOSb output, an OUTPUT_DISb input, a MUTEb input, and a bi-directional RATE_SEL/STATUS interface. The AUTO_MANb input signal sets the deserializer to either be in automatic or manual format detect modes. In the automatic mode, the deserializer will detect the format of the serial input data stream 102 and will then automatically configure its outputs 122 accordingly to that detected format. In manual mode the user tells the deserializer what format to look for in the serial data stream 102. The LOCK output signal indicates that the deserializer has locked onto the input data stream 102. The LOSb output indicates that the deserializer has lost the input signal 102. The OUTPUT_DISb and MUTEb inputs effectively turn off the output lanes 122. The RATE_SEL/STATUS line is bidirectional—it operates as an input to the deserializer when it is in manual mode, providing the format or rate to look for, and it operates as an output in automatic mode telling the user what rate it is currently detecting.

Figure 2:
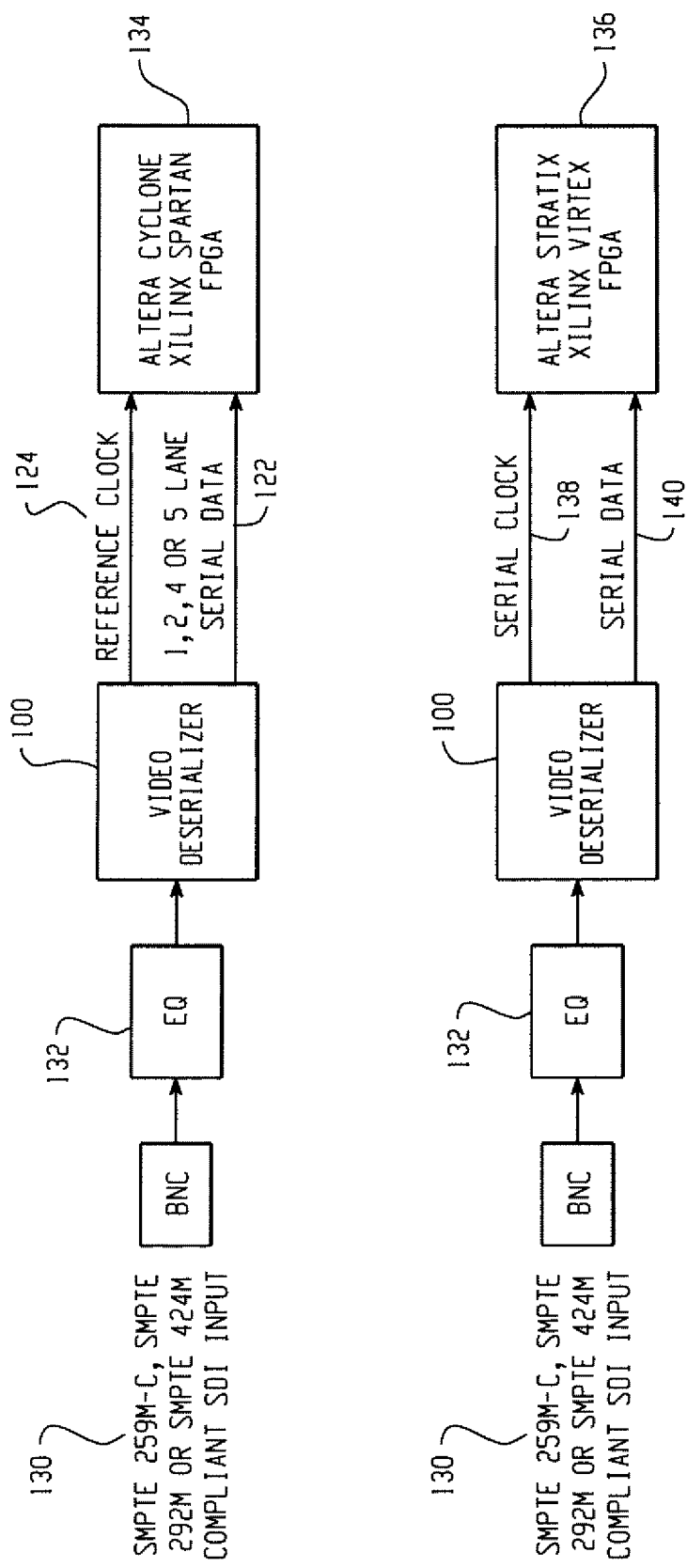
FIG. 2 sets forth two example applications of the video deserializer shown in FIG. 1.

FIG. 2 sets forth two example applications of the video deserializer 100 shown in FIG. 1. The first example provides a low cost SMPTE 259M-C, 292M or 424M SDI deserializer function in which an SDI input signal 130 is provided through a BNC connection to an equalizer 132. The output of the equalizer 132 is then provided to the deserializer 100, which generates a reference clock 124 and a selectable number of multi-lane serial data signals 122. The multi-lane serial data signals 122 together provide a pseudo-parallel interface to the FPGA 134, which may be, for example, an Altera Cyclone or Xilinx Spartan FPGA. The serial data signals 122 of the pseudo-parallel interface may be selectable between 1, 2, 4 or 5 lanes, and preferably comprise LVDS differential signals.

The second example shown in FIG. 2 provides a high-performance low-jitter SMPTE 292M/424M SDI deserializer implementation, which is similar to that shown in the first example except that the interface between the deserializer 100 and the FPGA 136 comprises a serial clock 138 and a single differential serial data lane 140.

Figure 3:
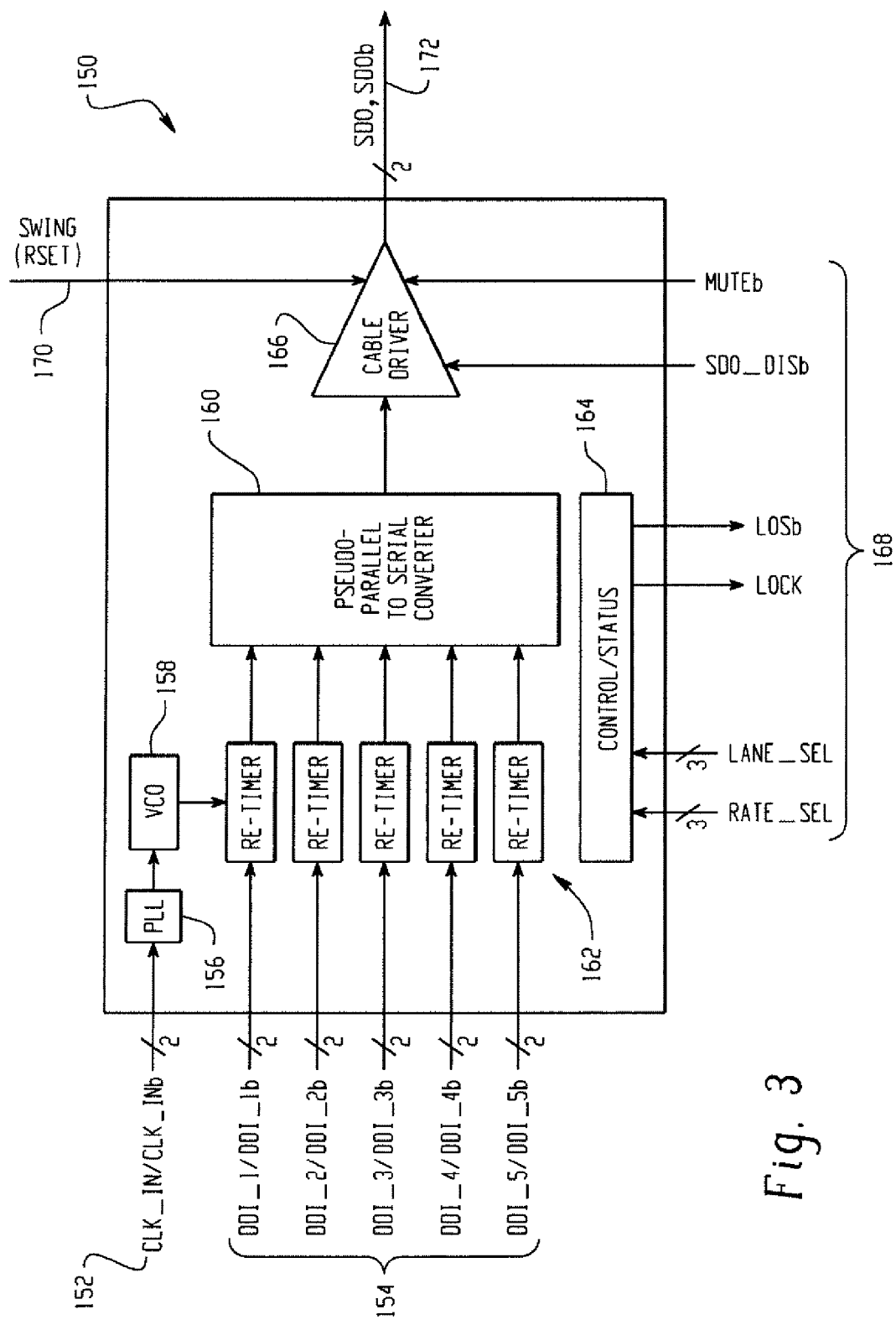
FIG. 3 is a block diagram of an example video serializer having a selectable multi-lane serial interface.

FIG. 3 is a block diagram of an example video serializer 150 having a selectable multi-lane serial interface 154. The serializer 150 includes a PLL 156, a VCO 158, a plurality of re-timer blocks 162, a control/status block 164, a de-skewing and formatting parallel to serial converter 160, and a cable driver 166.

A selectable number (e.g., 1, 2, 4 or 5) of differential serial data lanes 154 are input to the plurality of re-timing blocks 162 of the serializer 150. An input reference clock 152 is also received by the phase locked loop 156, which drives a voltage controlled oscillator 158 to generate an internal reference clock for the re-timing blocks 162. The output of the plurality of re-timing blocks is a re-timed version of the differential serial data lanes 154. These re-timed differential serial data signals are fed, in parallel, to the de-skew and formatting parallel to serial converter block 160. This block 160 performs a de-skewing operation on the parallel data signals from the re-timer blocks 162 and then, according to the selectable number of data lanes as defined by the input signal LANE_SEL 168, combines the selectable number of data lanes into a single serial data stream. The single serial data stream is output from the parallel to serial converter 160 to the cable driver 166, which then drives the differential SDI signal 172 onto an attached cable.

Other control signals are also provided, including a RATE_SEL input signal, a LOCK output signal, a LOSb output signal, a SDO_DISb input signal, a MUTEb input signal, and a SWING(RSET) input signal. These signals have similar functions to those described with respect to the deserializer in FIG. 1. The SWING (RSET), SDO_DISb and MUTEb input signals control the operation of the cable driver 166, setting its output voltage swing and determining whether its output is enabled or disabled.

Figure 4:
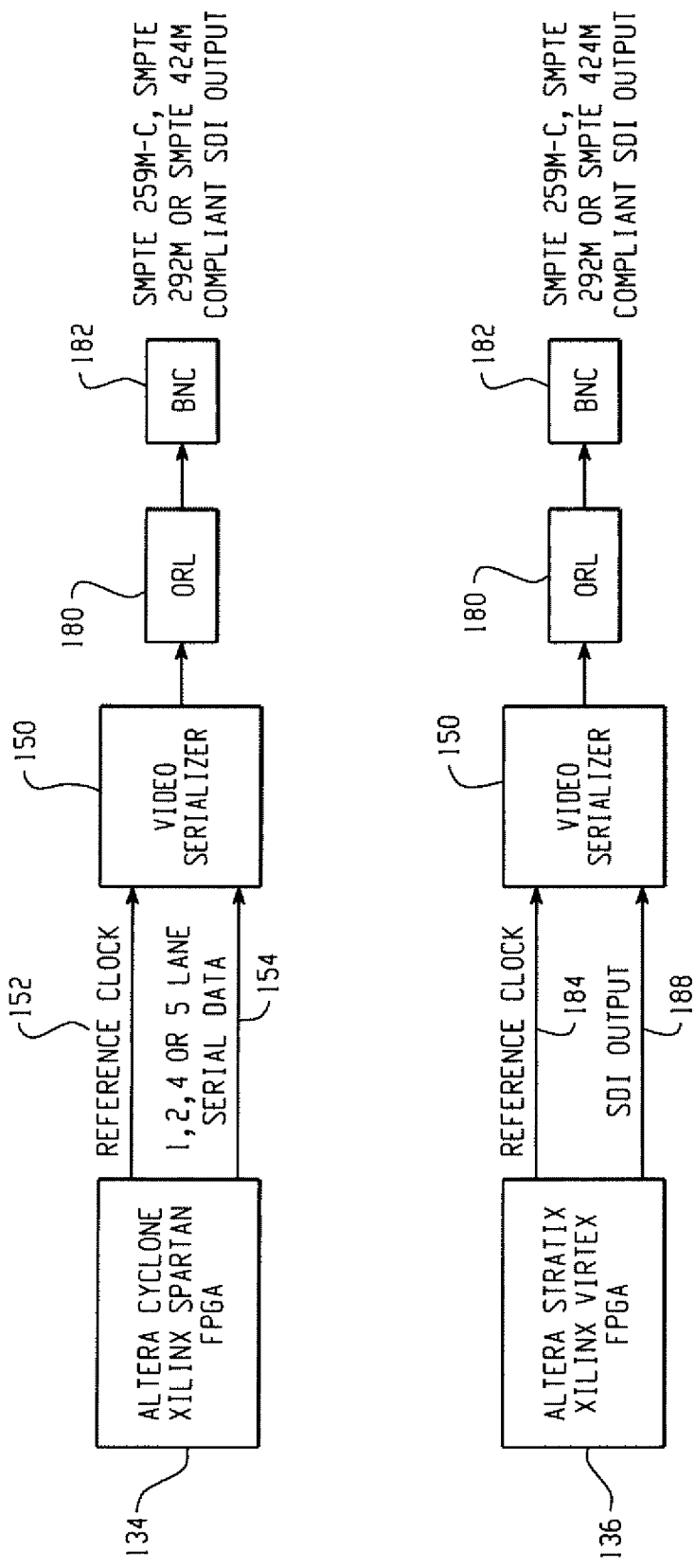
FIG. 4 sets forth two example applications of the video serializer shown in FIG. 3.

FIG. 4 sets forth two example applications of the video serializer shown in FIG. 3. These two examples are similar to the example applications of the de-serializer shown in FIG. 2, but operate to generate an SDI data stream from a selectable multi-lane serial interface. The first example provides a low cost SMPTE 259-C, 292M or 424M SDI serializer function in which an SDI output signal is generated from a selectable number of multi-lane serial data signals 154 output from an FPGA 134, which may be, for example, an Altera Cyclone or Xilinx Spartan FPGA. More specifically, the selectable number of multi-lane serial data signals 154 and a reference clock 152 are received by the video serializer 150 from the FPGA 134. The video serializer 150 converts the multi-lane (pseudo-parallel) data signals 154 into a serial data stream that is timed using the reference clock 152. The serial data stream is fed through an output return loss (ORL) matching network 180 to optimize the return loss of the signal, and is output to a BNC connector 182 for transmission over a coaxial cable.

The second example shown in FIG. 4 provides a high performance low jitter SMPTE 292M/424M SDI serializer implementation, which is similar to that shown in the first example except that the interface between the FPGA 136 and the serializer 150 comprises a reference clock 184 and a single SDI output 188.

Figure 5:
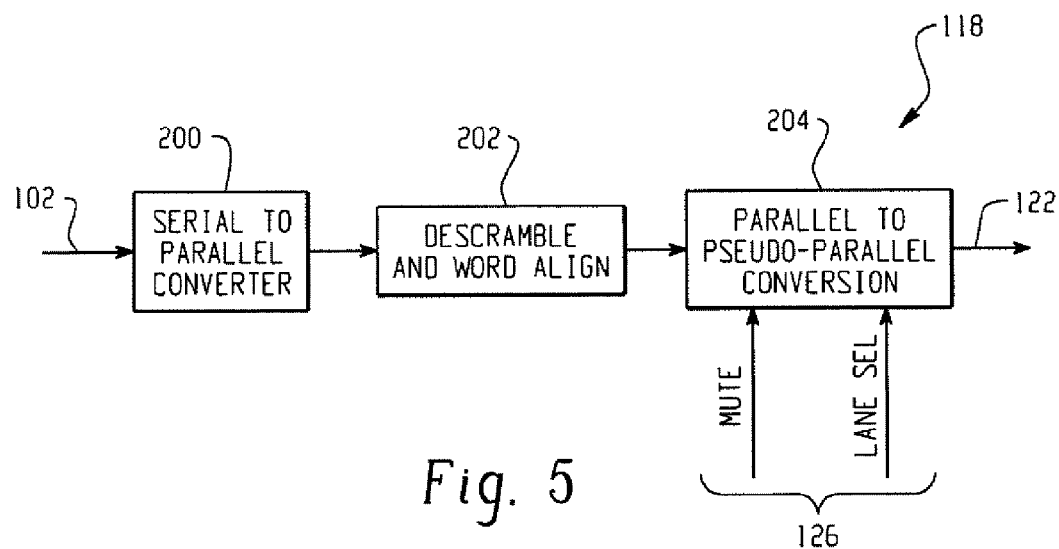
FIG. 5 is an example block diagram of circuitry in the video deserializer of FIG. 1 for generating the selectable multi-lane serial interface.

FIG. 5 is an example block diagram of circuitry 118 in the video deserializer of FIG. 1 for generating the selectable multi-lane serial interface 122. In this example, the re-timed serial data stream 102 from the re-timer block 106 is provided to a serial to parallel converter 200, a descramble and word align block 202 and finally to a parallel to pseudo-parallel converter 204. The serial data stream is made fully parallel in the block 200, such that if the SDI data comprises a 20 bit video signal, then the block 200 provides a 20 bit parallel interface output to the descramble and word align block 202. The descrambling operation unscrambles the video data, which is typically scrambled according to certain SMPTE standards for transmitting video data, and also may perform a word align function. The word align function examines the video data and determines whether it includes certain patterns and then separates binary digits into code words. After descrambling and aligning functions are completed, in the parallel domain, the 20 bit parallel data is then provided to the block 204, which converts the fully parallel data stream into the pseudo-parallel data stream 122 comprising a plurality of multi-lane serial lines. The control signal LAN_SEL 126 determines whether the conversion in block 204 is to 1, 2, 4 or 5 lanes, for example. The MUTE signal turns off the output of the converter 204.

Figure 6:
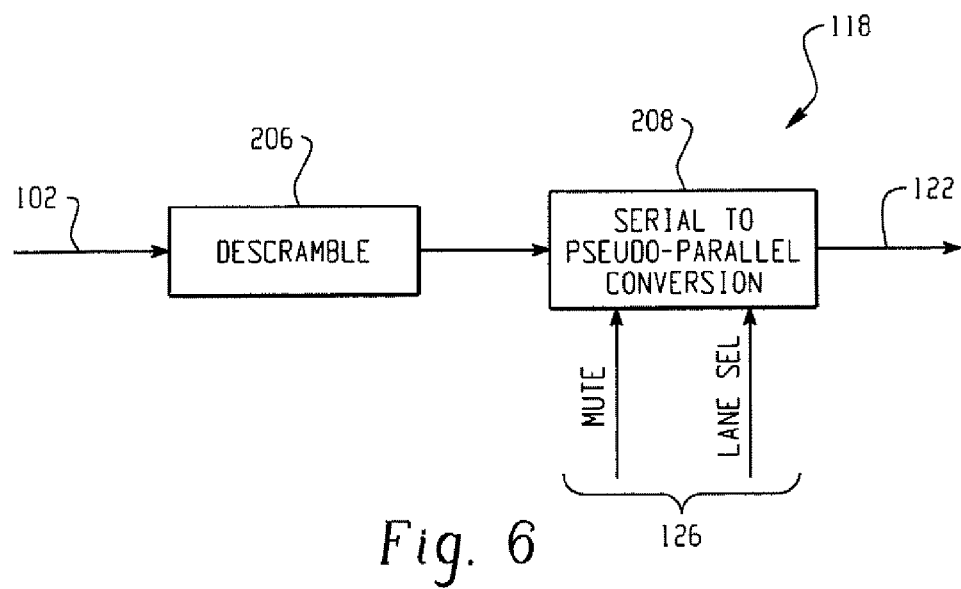
FIG. 6 is another example block diagram of circuitry in the video deserializer of FIG. 1 for generating the selectable multi-lane serial interface.

FIG. 6 is another example block diagram of circuitry 118 in the video deserializer of FIG. 1 for generating the selectable multi-lane serial interface. This circuit is similar to FIG. 5, except that the descrambling operation 206 occurs on the serial data stream 102, instead of a fully parallel data stream, and the conversion block 208 is a serial to pseudo-parallel converter. Although the descrambling operation is shown in FIGS. 5/6 as taking place in the deserializer 100, it could, alternatively, take place in the FPGA 134/136.

While certain examples have been used to disclose and illustrate one or more embodiments of the invention, including the best mode, and also to enable any person skilled in the art to make and use the invention, the patentable scope of the invention is defined by the claims, and may include other examples that occur to those skilled in the art.

It is claimed:

1. A video processing system, comprising:
    a video deserializer having an input for receiving a serial data stream containing video data and a serial to pseudo-parallel converter, coupled to the serial data stream, for generating from the serial data stream a plurality of serial data output streams through a plurality of serial output lanes, wherein the video deserializer is configured to convert the serial data stream to a parallel output, perform an operation on the parallel output, and then convert the parallel output to the plurality of serial data output streams;
    a video serializer having a plurality of inputs for receiving the serial data output streams and a pseudo-parallel to serial converter, coupled to the serial data output streams, for generating a single serial data stream; and
    a programmable video processing device, coupled to the video deserializer and the video serializer, the programmable processing device having a plurality of interface pins for receiving the plurality of serial data output streams from the deserializer and for transmitting the plurality of serial data output streams to the video serializer.

2. The system of claim 1, wherein the serial to pseudo-parallel converter in the video deserializer includes means for selecting a number of serial data output streams to be output through the output lanes.

3. The system of claim 1, wherein the serial data output streams are differential signals.

4. The system of claim 3, wherein the serial data output streams are low voltage differential signals (LVDS).

5. The system of claim 1, wherein the pseudo-parallel to serial converter in the video serializer enables selecting the number of serial data output streams.

6. The system of claim 1, further comprising an equalizer that generates the serial data stream.

7. The system of claim 6, wherein the equalizer is included on the same integrated circuit as the video deserializer.

8. The system of claim 1, wherein the serial to pseudo-parallel converter descrambles the serial data stream prior to generating the plurality of serial data output streams.

9. The system of claim 1, wherein the operation is a descrambling operation.

10. The system of claim 8, wherein the video deserializer performs the descrambling operation directly to the serial data stream.

11. The system of claim 1, wherein the operation is an aligning operation.

12. The system of claim 1, wherein the programmable video processing device is a FPGA video processor.

13. The system of claim 1, wherein the video deserializer further comprises:
    a clocking circuit for extracting a clock signal from the serial data stream; and
    a re-timing circuit, coupled to the serial data stream and the extracted clock signal, for generating a re-timed data stream that is input to the serial to pseudo-parallel converter.

14. The system of claim 13, wherein the clocking circuit comprises:
    a clock extract block for extracting the clock signal from the serial data stream; and
    a clock and data recovery circuit coupled to the extracted clock signal and an external reference clock for generating a retiming clock that is coupled to the re-timing circuit.

15. The system of claim 2, wherein the video deserializer further comprises a lane select control input for setting the number of serial data output streams generated by the serial to pseudo-parallel converter.

16. The system of claim 1, wherein the video serializer further comprises:
    a clocking circuit for receiving a reference clock; and
    a plurality of re-timing circuits, coupled to the plurality of input serial data streams, for generating a plurality of re-timed input serial data streams.

17. The system of claim 1, wherein the video serializer further comprises a cable driver coupled to the single serial data stream for generating an output differential serial data stream.

18. The system of claim 1, wherein the video serializer performs a de-skewing operation on the plurality of input serial data streams.

19. A video deserializer, comprising:
    an input for receiving a serial data stream containing video data; and a serial to pseudo-parallel converter, coupled to the serial data stream, for generating a plurality of serial data output streams through a plurality of serial output lanes from the serial data stream, each of the plurality of serial data output streams including a portion of the input serial data stream, and the serial to pseudo-parallel converter being configured to convert the serial data stream to a parallel output, perform an operation on the parallel output, and then convert the parallel output to the plurality of serial data output streams.

20. The video deserializer of claim 19, wherein the serial to pseudo-parallel converter includes a selectable number of serial data output streams.

21. The video deserializer of claim 19, wherein the serial data output streams are differential signals.

22. The video deserializer of claim 21, wherein the serial data output streams are low voltage differential signals (LVDS).

23. The video deserializer of claim 19, further comprising:
a clocking circuit for extracting a clock signal from the serial data stream; and
a re-timing circuit, coupled to the serial data stream and the extracted clock signal, for generating a re-timed serial data stream that is input to the serial to pseudo-parallel converter.

24. The video deserializer of claim 23, wherein the clocking circuit comprises:
a clock extract block for extracting the clock signal from the serial data stream; and
a clock and data recovery circuit coupled to the extracted clock signal and an external reference clock for generating a retiming clock that is coupled to the re-timing circuit.

25. The video deserializer of claim 20, further comprising a lane select control input for setting the number of serial data output streams generated by the serial to pseudo-parallel converter.

26. The video deserializer of claim 20, further comprising an equalizer that generates the serial data stream.

27. The video deserializer of claim 20, further comprising a descrambler that descrambles the serial data stream.

28. The video deserializer of claim 27, wherein the descrambler operates in the serial domain.

29. The video deserializer of claim 27, further comprising a serial to parallel converter that converts the serial data stream to a parallel output to the descrambler, wherein the descrambler operates in the parallel domain.

30. The video deserializer of claim 29, wherein the serial to pseudo-parallel converter converts the descrambled parallel output into the plurality of serial data output streams.

31. The video deserializer of claim 29, further comprising a word align block that word aligns the parallel output.

32. The video deserializer of claim 20, wherein the plurality of serial data output streams are configured to be input to a FPGA video processor.

33. A video processing system, comprising:
a video deserializer having an input for receiving a serial data stream containing video data and a serial to pseudo-parallel converter, coupled to the serial data stream, for generating a plurality of serial data output streams through a plurality of serial output lanes from the serial data stream, wherein the video deserializer is configured to convert the serial stream data to a parallel output, perform an operation on the parallel output, and then convert the parallel output to the plurality of serial data output streams; and a programmable video processing device, coupled to the video deserializer and the video serializer, the programmable processing device having a plurality of interface pins for receiving the plurality of serial data output lanes from the deserializer.

34. The system of claim 33, wherein the serial to pseudo-parallel converter in the video deserializer includes a selectable number of serial output lanes.

35. The system of claim 33, wherein the serial data output streams are differential signals.

36. The system of claim 33, further comprising an equalizer that generates the serial data stream.

37. The system of claim 36, wherein the equalizer is included on the same integrated circuit as the video deserializer.

38. The system of claim 33, wherein serial to the pseudo-parallel converter descrambles the serial data stream prior to generating the plurality of serial data output streams.

39. The system of claim 33, wherein the video deserializer converts the serial data stream to a parallel output and converts the parallel output to the plurality of serial data output streams.

40. The system of claim 39, wherein the video deserializer performs a descrambling operation on the parallel output prior to generating the plurality of serial data output streams.

41. The system of claim 38, wherein the video deserializer performs the descrambling operation directly to the serial data stream.

42. The system of claim 33, wherein the video deserializer further comprises:
a clocking circuit for extracting a clock signal from the serial data stream; and
a re-timing circuit, coupled to the serial data stream and the extracted clock signal, for generating a re-timed data stream that is input to the serial to pseudo-parallel converter.

43. The system of claim 42, wherein the clocking circuit comprises:
a clock extract block for extracting the clock signal from the serial data stream; and
a clock and data recovery circuit coupled to the extracted clock signal and an external reference clock for generating a retiming clock that is coupled to the re-timing circuit.

44. The system of claim 34, wherein the video deserializer further comprises a lane select control input for setting the number of serial output lanes generated by the serial to pseudo-parallel converter.

45. A method comprising:
receiving a serial data stream containing video data; and
generating from the serial data stream a plurality of serial data output streams through a plurality of serial output lanes, said generating including converting the serial stream data to a parallel output, performing an operation on the parallel output, and then converting the parallel output to the plurality of serial data output streams.

46. The method of claim 45 further comprising:
generating a single serial data stream from the plurality of serial data output streams.

47. The method of claim 45 wherein each of the plurality of serial data streams includes a portion of the received serial data stream.

48. The method of claim 45, wherein the operation is a descrambling operation.

49. The method of claim 45, wherein the operation is a word aligning operation.

* * * * *